United States Patent [19]

Rose et al.

[11] Patent Number: 5,435,596
[45] Date of Patent: Jul. 25, 1995

[54] PASSENGER AIRBAG MODULE DEPLOYMENT DOOR ATTACHMENT SYSTEM

[75] Inventors: Larry D. Rose, Layton; Lisa M. Frary, S. Weber; Thomas M. Kriska, Kaysville; Edward Friery, Coalville, all of Utah

[73] Assignee: Morton International, Inc., Chicago, Ill.

[21] Appl. No.: 239,600

[22] Filed: May 9, 1994

[51] Int. Cl.⁶ .............................................. B60R 21/16
[52] U.S. Cl. ................... 280/728.2; 280/732
[58] Field of Search ............ 280/728 R, 728 A, 728 B, 280/732; 403/286, 341

[56] References Cited

U.S. PATENT DOCUMENTS

| | | | |
|---|---|---|---|
| 4,111,457 | 9/1978 | Kob et al. | 280/728 A |
| 4,989,897 | 2/1991 | Takada | 280/732 |
| 5,167,427 | 12/1992 | Baba | 280/728 B |
| 5,303,951 | 4/1994 | Goestenkors et al. | 280/728 B |
| 5,312,129 | 5/1994 | Ogawa | 280/728 A |
| 5,342,090 | 8/1994 | Sobczak et al. | 280/732 |
| 5,348,339 | 9/1994 | Turner | 280/728 B |

FOREIGN PATENT DOCUMENTS

356247 12/1992 Japan ...................... 280/728 A

Primary Examiner—Brian L. Johnson
Assistant Examiner—Paul N. Dickson
Attorney, Agent, or Firm—George W. Rauchfuss, Jr.; Gerald K. White

[57] ABSTRACT

A passenger airbag module deployment door attachment system includes a molded plastic deployment door unit having a front wall providing a deployment doorway. Attachment legs extend rearwardly from the front wall for interlocking engagement with mating portions of walls of the airbag module. At least one band encircles the attachment legs for holding them in their interlocking engagement. Four attachment legs are shown surrounding a deployment passageway in encircling relationship. This passageway leads from an exit of the airbag module to the deployment doorway. The four attachment legs as shown provide four support surfaces effectively surrounding the deployment passageway for supporting and directing toward the doorway a high-energy expanding cushion (airbag) during its deployment. These attachment legs absorb impact energy and provide reinforcement for the front wall of the molded plastic unit. Each attachment leg has a band-receiving channel with a convex arcuate profile for causing tension "T" in an attachment band to provide inwardly-directed clamping force "F" distributed along the band-receiving channel for firmly securing interlocking engagement of the attachment legs to the walls of the airbag module.

18 Claims, 5 Drawing Sheets

PASSENGER AIRBAG MODULE DEPLOYMENT DOOR ATTACHMENT SYSTEM

TECHNICAL FIELD

This invention relates to the field of motor vehicle airbag systems. More specifically the present invention relates to an attachment system for attaching an airbag module to a molded plastic deployment door.

BACKGROUND

A typical passenger airbag deployment assembly comprises an airbag module (including inflator, inflatable cushion and reaction canister) and a deployment door which interfaces with the module and with a vehicle surface facing toward a seated occupant's position, for example such vehicle surface may be the vehicle instrument panel. To provide a good matching fit and finish the deployment door usually is made of a plastic material similar to the instrument panel or other adjacent surface area in which the deployment door is mounted.

During a deployment, the door is designed either to detach and pivot or swing out of the way or to split at the surface and swing open for allowing an inflatable cushion (often called an "airbag") to pass through the resulting opening. Since deployment forces are very high, the attachment system between the airbag module and the deployment door must be very reliable. Generally attachment systems for passenger airbag modules which perform this function of attaching a module to a deployment door require an array of multiple fasteners to insure structural performance. Consequently, completion of installation in a vehicle of such prior attachment systems with their array of multiple fasteners has been time-consuming and difficult.

Accordingly, it is among the objects of the present invention to provide an attachment system for securely attaching an airbag module to a molded plastic deployment door which overcomes or substantially reduces disadvantages of prior attachment systems and eliminates the need for an array of multiple fasteners.

SUMMARY OF THE DISCLOSURE

The invention is shown embodied in a deployment door to airbag module attachment system which is strong enough to withstand high deployment forces, economical to manufacture, enables use of a relatively small packaging envelope, is easy to assemble and requires only one band type of fastener.

The attachment system as shown comprises three major components: 1) a molded plastic deployment door with attachment legs extending rearwardly from a front wall of the deployment door; 2) the airbag module with interlockable means shown as sidewall channels; and 3) an attachment band set.

The molded plastic deployment door can be formed in a variety of shapes and sizes depending on interface requirements associated with an adjacent surface of a vehicle such as the instrument panel. The important features, as they relate to presently preferred embodiments of the invention, are attachment legs extending rearwardly from a front wall of the deployment door and each having an interlockable section, shown as a protruding section. The interlockable sections of the attachment legs are matable in interlocking relationship with cooperating interlockable sections on walls of the airbag module. The latter interlockable sections are shown as channels, for receiving protruding sections of respective attachment legs. Band set channels are provided for receiving attachment bands which are applied for holding the interlockable sections of the attachment legs in secure interlocked relationship with the interlockable sections of the walls of the airbag module. These band set channels are shown formed in the attachment legs in alignment with and overlying the protruding sections of the attachment legs.

The preferred configuration of the band set channels is a convex-formed arc profile. The convex profile may be described as generally thicker through the middle and thinner at the ends. This arc configuration creates a resultant distributed clamping force for the band set which helps firmly to secure the protruding section of each attachment leg into a respective wall channel on the airbag module.

BRIEF DESCRIPTION OF THE DRAWINGS

The invention, together with further objects, features, advantages and aspects thereof, will be more clearly understood from the following detailed description considered in conjunction with the accompanying drawings which are not drawn to scale with the emphasis instead being placed upon clearly illustrating the principles of the invention. Like reference numerals indicate like elements or like components throughout the different views.

The accompanying drawings, which are incorporated in and constitute a part of the specification, illustrate a presently preferred embodiment of the invention and, together with the general description set forth above and the detailed description of the preferred embodiments set forth below, serve to explain the principles of the invention. In these drawings:

FIG. 5 is an enlarged partial sectional view similar to FIG. 4. FIG. 5 shows an alternative embodiment of the convex arc profile of the band channel created by a plurality of spaced ribs of different heights.

DETAILED DESCRIPTION OF PREFERRED EMBODIMENT

Figure 1:
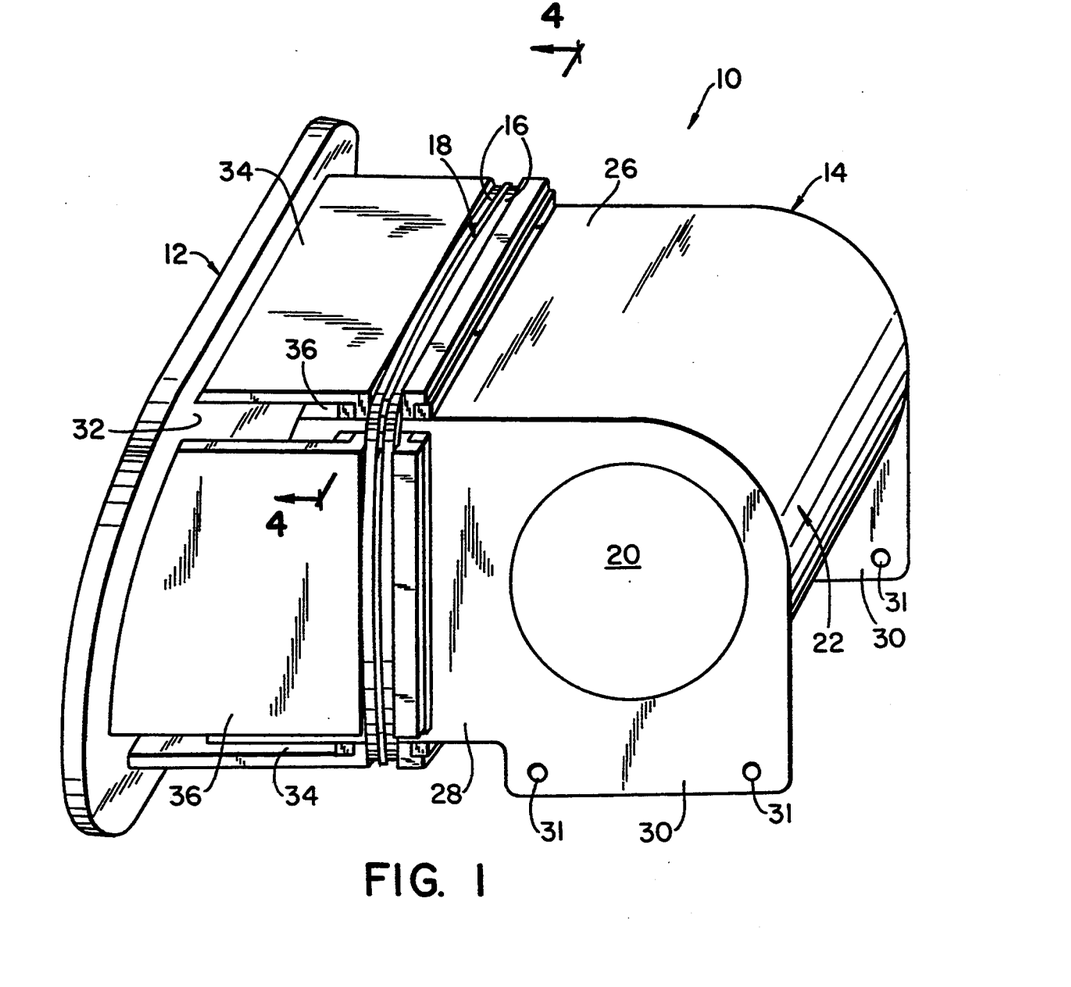
FIG. 1 is a perspective view showing an airbag module assembly including a molded deployment door at the left and an airbag module (including inflator, inflatable cushion and reaction canister) at the right.

In FIG. 1 is shown an airbag deployment assembly 10 comprising a molded plastic deployment door unit 12 attached to an airbag module 14 by a pair of attachment bands 16, which may be called an attachment band set. These two bands 16 function independently of each other. This band set 16, 16 provides clamping force for assuring integrity of an interlocking joint located at 18, between the deployment door unit 12 and the airbag module 14. This interlocking joint 18 will be described in detail later. By design only one band 16 is generally sufficient for providing a reliably secure interlocked joint 18. Two independently functioning bands may be used for redundancy or increased locking force.

The airbag module 14 comprises an inflator 20, a reaction canister 22 containing the inflator and an inflatable cushion 24 (FIG. 2) packed into the canister. The canister has an exit 25 at the front for allowing the cushion (airbag) 24 to deploy as shown by arrow 39 (FIG. 2) from the canister as the cushion is being inflated. The reaction canister 22 is shown having an upper wall 26 in spaced parallel relationship with a lower wall (not seen), and the exit 25 is located between front portions of these walls. The canister also has spaced, parallel sidewalls 28 (only one is seen) with the exit being located between front portions of these sidewalls. The upper and lower walls 26 are wider than the sidewalls 28, and thus the upper and lower walls may be considered to be main walls of the reaction canister 22.

In order to mount the deployment assembly 10 in a vehicle, the sidewalls 28 of the reaction canister 22 are shown having protruding mounting flanges 30 including mounting points 31, for example provided by openings in the flanges.

Figure 2:
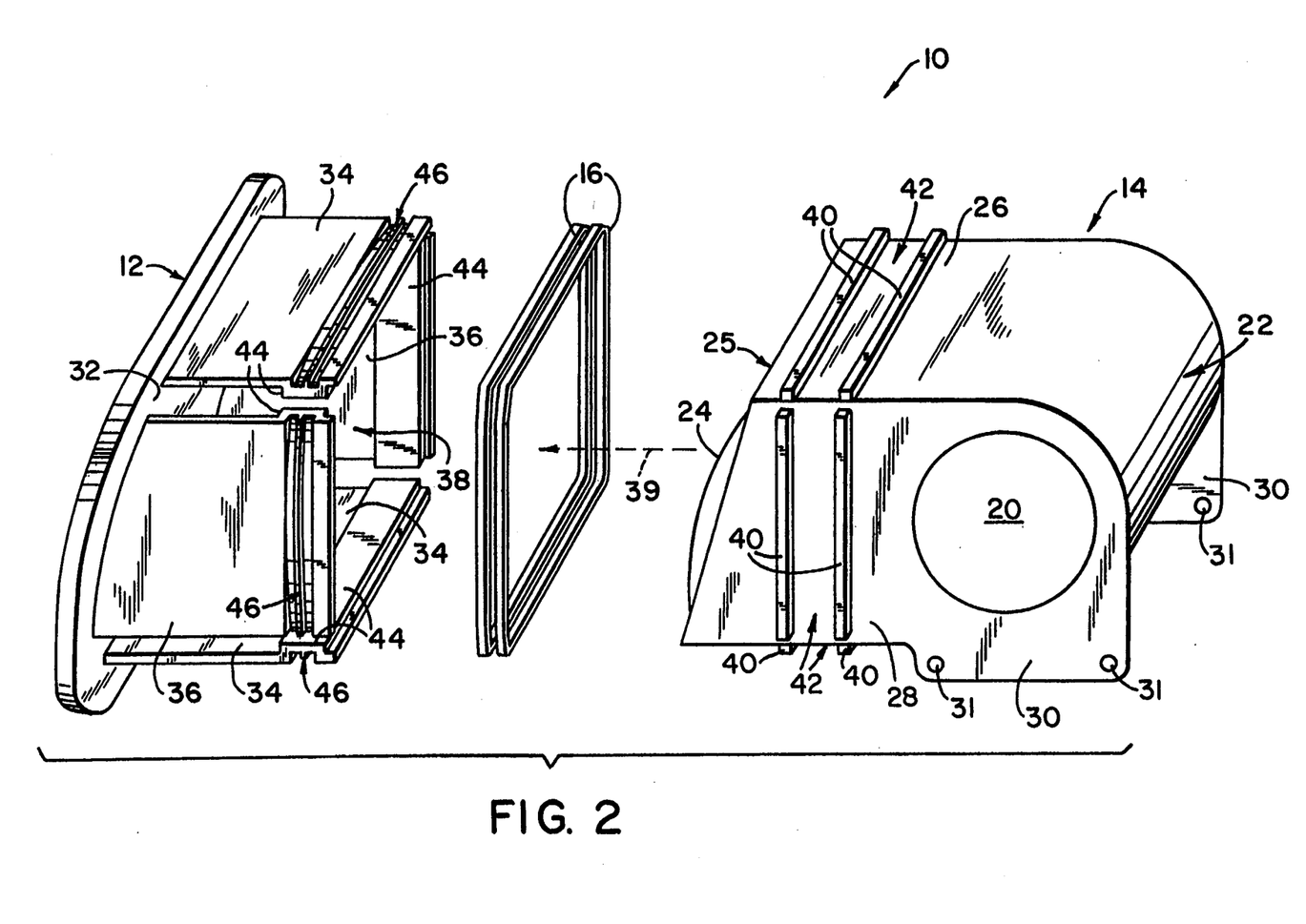
FIG. 2 is an exploded perspective view of the airbag module assembly of FIG. 1 showing the molded deployment door with its attachment legs at the left, the airbag module at the right and a pair of attachment bands near the center, which may be called "an attachment band set".

For convenience of description and understanding the terms "front", "forward" and the like, and the terms "rear", "rearward" and the like are employed with reference to the airbag deployment assembly 10 as illustrated in FIGS. 1 and 2. "Front" and "forward" means toward the left in those FIGS. Conversely, "rear" and "rearward" means toward the right in those FIGS. These convenient terms of description are not intended as limiting with respect to various possible mounting positions and orientations in which such deployment assemblies may be mounted in various vehicles.

The molded plastic deployment door unit 12 comprises a front wall 32 and attachment legs extending rearwardly from the front wall. There are spaced, parallel upper and lower attachment legs 34 (FIG. 2) and spaced, parallel side attachment legs 36. The upper and lower attachment legs 34 are wider than the side attachment legs 36 and thus may be considered to be a main pair of attachment legs. These pairs of attachment legs 34, 34 and 36, 36 surround a deployment passageway 38 (FIG. 2) which is aligned with the forwardly-facing exit 25 from the reaction canister 14.

These attachment legs 34, 34 and 36, 36 function in at least three desirable ways: 1) they provide four support surfaces effectively surrounding (encircling) the deployment passageway 38 for supporting and directing forwardly the high-energy, expanding cushion 24 during its deployment in the direction 39 from module exit 25 along passageway 38 and out through the deployment door 12; 2) these attachment legs absorb impact energy; and 3) the attachment legs provide reinforcement for stiffening the front wall 32 of the deployment door for long term durability of this plastic deployment door unit. The length and thickness of each attachment leg are designed in accordance with the intended location in a vehicle, for example in accord with the instrument panel envelope, i.e., available space, and strength requirements. In some vehicle installations, the side attachment legs 36 may be optional, depending upon configurations of the attachment door front wall 32 and main upper and lower attachment legs 34 and configurations of the airbag module 14.

Figure 6:
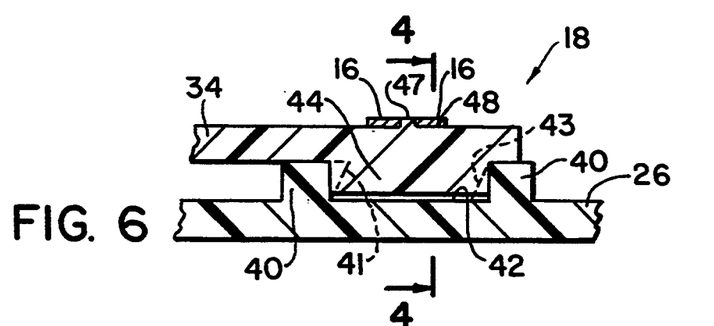
FIG. 6 is an enlarged partial sectional view taken along the plane 6—6 in either FIG. 4 or FIG. 5 near the center of an interlocking attachment joint showing details of the interlocked joint.
Figure 7:
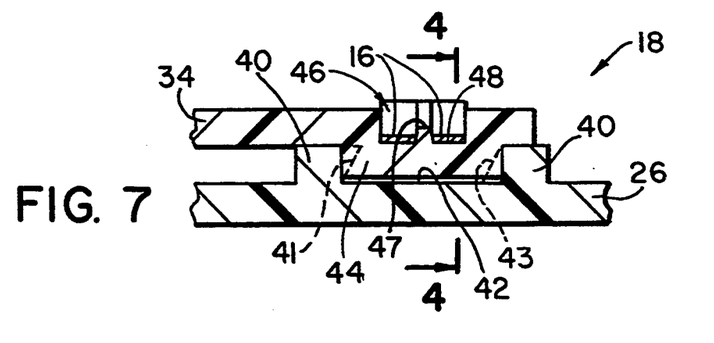
FIG. 7 is an enlarged partial sectional view similar to FIG. 6, except that FIG. 7 is taken along the plane 7—7 in either FIG. 4 or FIG. 5 near an end of the interlocking attachment joint.

The four walls 26 and 28 of the airbag module 14 are formed with pairs of spaced parallel ridges 40 on their outside surfaces for providing spaced channel walls for defining channels 42 between these paired ridges. The channels 42 are intended for receiving protruding sections or elements 44 of the four extending attachment legs, as shown in FIGS. 6 and 7, for providing the interlocking joint 18.

As seen most clearly in FIG. 2, the protruding sections (elements) 44 of the respective attachment legs 34, 34 and 36, 36 are located on their inside surfaces. These protruding sections are positioned on rearward portions of the attachment legs. The attachment legs are stiffly flexible with sufficient compliance for enabling engagement of respective protruding sections 44 into their respective mating channels 42 for assembling the interlocking joints 18.

In order to receive the band set 16, 16, there are channels 46 (FIG. 2) provided on the outside surfaces of the attachment legs. These band set channels 46 are aligned with the protruding sections 44 and overlie these sections.

Only two convenient steps are needed for assembling the deployment door unit 12 with the airbag module 14: (1) first the door unit 12 is pressed onto the module 14 by pressing on the front wall 32 of the door unit until the inwardly protruding section or element 44 of each attachment leg snaps into its respective mating sidewall channels 42; and then (2) the band set 16, 16 is installed in the band-receiving channels 46 and secured.

It is noted that the ridges 40 and channels 42 on the walls of the module 14 can be formed in a variety of ways depending upon the configuration of the module 14 and its canister 22 and the material of which the walls 26 and 28 are formed. For example, the channels 42 and their adjacent ridges 40 may be included in an extruded section of an aluminum extruded module. As another example, the channels 42 may be formed into sheet metal walls 26 and 28 of a module.

In FIGS. 1, 2, 6 and 7, the channels 42 are shown formed normal to the module walls 26 and 28. As another example, the ridges 40 may be angled, for example a rearwardly-facing surface of the forward ridge 40 of the channel may slope for slightly overhanging the channel 42 as indicated by an angled dotted outline at 41 in FIGS. 6 and 7. Then, the forward surface of the protruding section or element 44 correspondingly may be angled for providing a mating hooking engagement in the interlocking joint. The forwardly-facing surface of the rear ridge 40 adjacent to the channel 42 and the rear surface of the protruding section 44 similarly may be angled as indicated at 43 in FIGS. 6 and 7. The angled surfaces at 43 are shown generally parallel with the angled surfaces at 41 for providing clearance for allowing the protruding element 44 to snap into the channel 42.

If the reader will imagine a geometric plane which is oriented perpendicular to the deployment direction 39, the reader will see that the channels 42 and the protruding sections 44 engaged in these channels for forming the interlocking joint 18 generally are oriented parallel with such an imaginary plane. In other words, the interlocking joint 18 encircles the deployment direction 39 and this joint lies in a plane which is perpendicular to this deployment direction for securely resisting deployment forces and reactions resulting from such forces.

Figure 3:
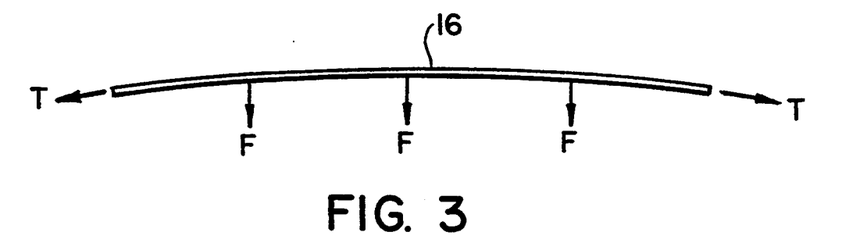
FIG. 3 is an enlarged edge view of an arcuate portion of an attachment band.

In order to provide a clamping force distributed along the length of the installed band 16 as shown by arrows "F" in FIG. 3, each band 16 is installed in a convex arcuate configuration. Consequently, the tension force "T" in the installed band provides an inwardly-acting, clamping force F advantageously distributed along the length of the band overlying the length of the protruding section 44 as seen in FIGS. 6 and 7. Thus, this inwardly-acting clamping force is distributed along the circumference of the interlocked joint 18 which encircles the deployment passageway 38. For creating this convex arcuate configuration in the band 16, each band-receiving channel 46 has a convex-formed arc profile.

Figure 4:
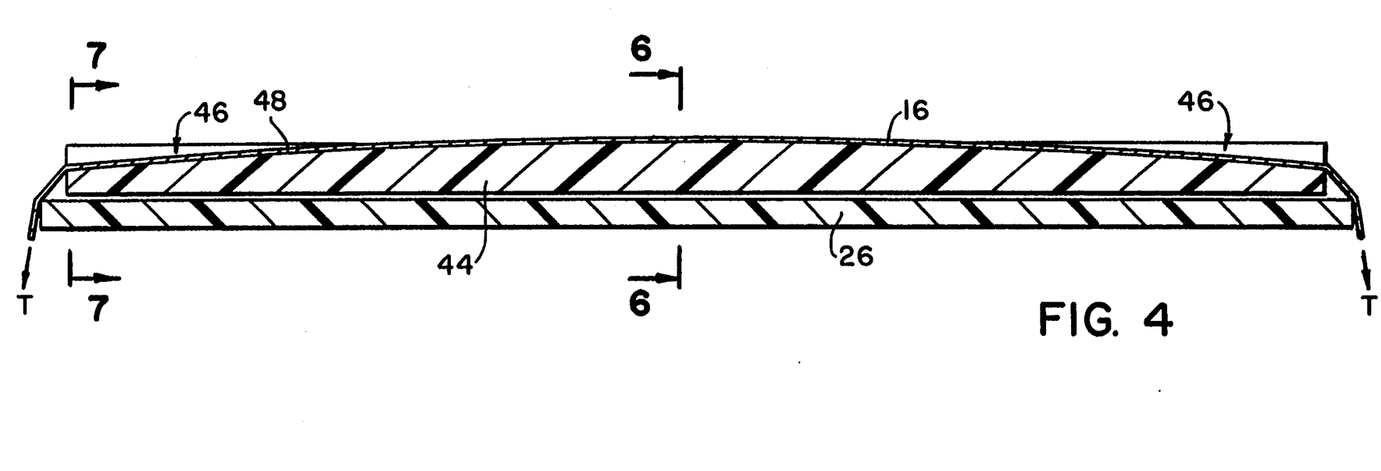
FIG. 4 is an enlarged partial sectional view taken along the plane 4—4 in FIG. 1 (and also taken along the planes 4—4 in FIGS. 6 and 7) showing the convex arcuate configuration of a band installed in its channel, which has a convex arc profile.
Figure 5:
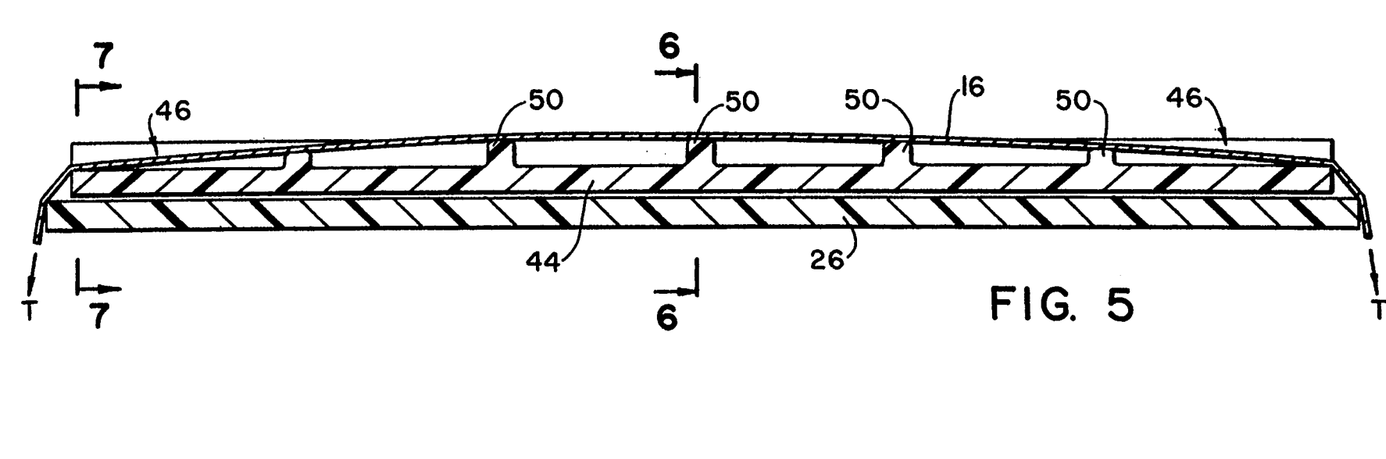

In FIG. 4 this convex arc profile is shown provided by a continuous arcuately curved band-seating surface 48 of each band-receiving channel 46. In other words, this convex profile may be described as generally thicker through the middle and thinner at the ends of the channel 46. In FIG. 5, this convex arc profile is shown provided by a plurality of spaced ribs 50 which are higher through a central region of this channel 46 and are progressively lower toward either end of this channel.

For keeping the bands 16 seated in parallel relation slightly spaced apart there is a narrow, raised, divider rib 47 (FIGS. 6 and 7) located between the band-receiving channels 46.

Figure 8:
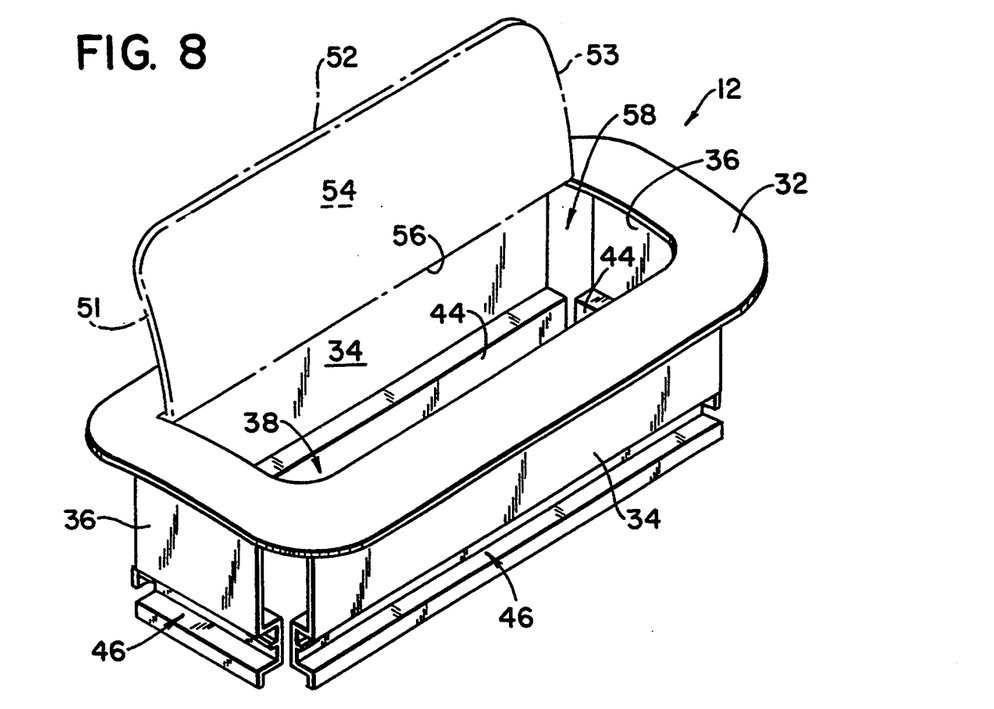
FIG. 8 is a perspective front view of the molded plastic deployment door unit with its attachment legs and showing an opened door in dashed outline. The opened door is shown detached along three edges from the front wall of the molded plastic unit, and it is shown pivoted (or swung) out of the way for allowing an inflatable cushion to pass through the resulting opening.

In FIG. 8, the front wall 32 of the molded plastic deployment door unit 12 is shown having a predetermined preformed, weakened detachment line extending along three edges 51, 52 and 53 of an openable door 54, i.e., having a broad U-shaped outline. The door is shown in dashed outline pivoted or swung open along a hinge line 56 for providing a doorway outlet 58 in the front wall 32. This doorway outlet 58 is located intermediate the pairs of spaced parallel attachment legs 34, 34 and 36, 36 so that the deployment passageway 38 (See also FIG. 2.) which is defined by these attachment legs is directly aligned with this doorway outlet.

Figure 9:
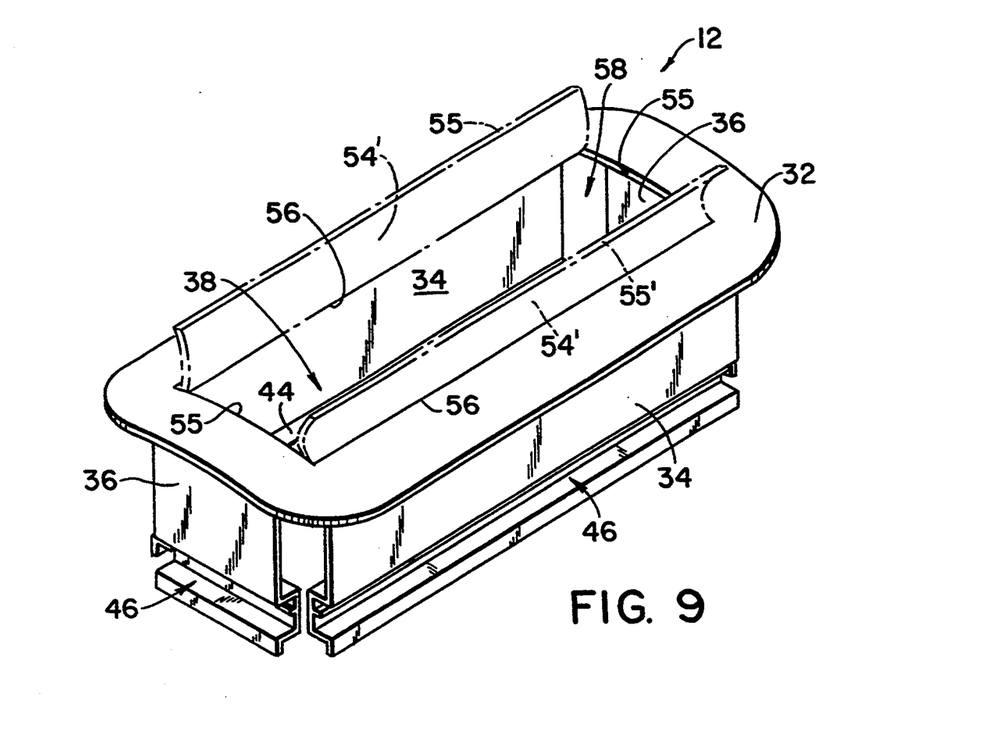
FIG. 9 is a perspective front view similar to FIG. 8, except that the opened door is shown in dashed outline as comprising two mirror-image halves. The front wall of the molded plastic deployment door unit has split along a centerline, thereby providing two door halves each of which has detached along two side edges, and they are shown pivoted (or swung) out of the way for allowing an inflatable cushion to pass through the resulting opening.

In FIG. 9, the front wall 32 of the molded plastic deployment door unit 12 is shown having a predetermined, preformed weakened detachment line having a broad H-shaped outline 55 such that the front wall becomes split along the middle. Thus, the openable door has two mirror-image halves 54' and 54' shown in dashed outline. These door halves 54' are shown pivoted or swung open along respective hinge lines 56 for providing a doorway outlet 58 in the front wall 32. This doorway outlet 58 is located intermediate the pairs of spaced parallel attachment legs 34, 34 and 36, 36 so that the deployment passageway 38 (Also seen in FIG. 2.) is directly aligned with this doorway outlet.

Since other changes and modifications varied to fit particular vehicle requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents of claimed elements.

We claim:

1. An airbag module deployment door attachment system for use with an airbag module in a vehicle, wherein the airbag module includes an inflator, a reaction canister containing the inflator and an inflatable cushion with an exit from the module for deployment of the inflatable cushion, said system comprising:

deployment door means including a front wall;

said front wall having door means therein adapted to open for allowing an inflatable cushion to pass through a doorway provided upon opening of the door means;

at least two attachment legs extending rearwardly from said front wall;

said attachment legs being in spaced, opposite relationship with said door means being located intermediate said attachment legs;

each of said attachment legs having interlockable means thereon;

said interlockable means being spaced rearwardly from said front wall;

said airbag module having at least two module walls in spaced, opposite relationship with said exit being located intermediate said module walls;

said module walls having interlockable means thereon;

said interlockable means of the attachment legs being an inwardly-protruding element of each attachment leg;

said inwardly-protruding element of each attachment leg being elongated in a direction generally perpendicular to a direction of deployment from said module exit to said door means and extending essentially a width of the attachment leg;

said interlockable means on said module walls including a channel in each module wall;

said channel in each module wall being elongated in a direction generally perpendicular to said direction of deployment and extending essentially a width of the module wall for receiving therein an elongated inwardly protruding element of an attachment leg;

said channel in each module wall having a forward channel wall spaced from a rearward channel wall; and at least one attachment band positionable for encircling the attachment legs for holding the elongated inwardly-protruding elements of respective attachment legs in interlocking relationship in respective elongated channels between the forward channel wall and the rearward channel wall of the respective elongated channels.

2. An airbag module deployment door attachment system as claimed in claim 1 in which:

the attachment legs extend forwardly from the respective elongated inwardly-protruding for being elements held in interlocking relationship in the respective elongated channels and the attachment legs extend forwardly from the module walls for defining opposite sides of a deployment passageway extending forwardly from the module exit to said door means; and said deployment passageway is aligned with said direction of deployment for supporting the inflatable cushion during deployment and for directing the inflatable cushion forwardly during deployment toward said door means.

3. An airbag module deployment door attachment system as claimed in claim 1, in which:

said interlockable means of the attachment legs include at least one outwardly-facing, band-receiving channel in each attachment leg;

the outwardly-facing, band-receiving channel of each attachment leg extends in a direction generally perpendicular to said direction of deployment and extends essentially the width of the attachment leg;

the outwardly-facing, band-receiving channel of each attachment leg is positioned in alignment with and overlies the elongated inwardly-protruding element of the attachment leg; and said attachment band is positionable for encircling the attachment legs in the outwardly-facing, band-receiving channels.

4. An airbag module deployment door attachment system as claimed in claim 3, in which:

each attachment leg has two parallel, outwardly-facing, band-receiving channels each positioned in alignment with and overlying the elongated inwardly-protruding element and each extending essentially a width of the attachment leg; and two parallel attachment bands are positionable encircling the attachment legs seated in respective ones of the two, parallel, outwardly-facing, band-receiving channels.

5. An airbag module deployment door attachment system as claimed in claim 4, in which:

each of said two outwardly-facing band-receiving channels includes means extending essentially the width of the attachment leg for curving the attachment band positionable therein into a convex arcuate configuration for causing tension of the attachment band to provide an inwardly-directed clamping force distributed across the width of the attachment leg.

6. An airbag module deployment door attachment system as claimed in claim 5, in which:

said means for curving the attachment band into a convex arcuate configuration comprise a plurality of ribs positioned at spaced intervals along each outwardly-facing, band-receiving channel;

said ribs have significant height near a center of said outwardly-facing, band-receiving channel; and said ribs are of progressively diminishing height toward each end of the outwardly-facing, band-receiving channel.

7. An airbag module deployment door attachment system as claimed in claim 3, in which:

the outwardly-facing, band-receiving channel of each attachment leg includes means for curving the attachment band positionable in the band-receiving channel into a convex arcuate configuration extending essentially the width of the attachment leg for tension of the attachment band to provide an inwardly-directed clamping force distributed across the width of the attachment leg.

8. An airbag module deployment door attachment system as claimed in claim 7, in which:

said means for curving the attachment band positionable in the outwardly-facing, band-receiving channel into a convex arcuate configuration comprise a plurality of ribs in the outwardly-facing, band-receiving channel positioned at spaced intervals across the width of the attachment leg;

said ribs have significant height near a central region of each attachment leg; and said ribs are of progressively diminishing height toward each edge of the attachment leg.

9. An airbag module deployment door attachment system as claimed in claim 3, in which:

said outwardly-facing, band-receiving channel of each attachment leg is divided by raised divider means into a set of two side-by-side outwardly-facing band-receiving channels; and a band set of two bands are provided with a respective band of the band set being positionable for encircling the attachment legs seated in a respective outwardly-facing, band-receiving channel of said set of channels.

10. An attachment system for a vehicle passenger airbag module including a reaction canister housing an airbag and an airbag inflator and wherein the airbag module has at least two spaced walls with an exit from the module located between the two spaced module walls for allowing an inflating airbag to deploy from the module through said module exit, said attachment system comprising:

interlockable means on each of said two spaced module walls;

a deployment door unit having a front wall mountable in an instrument panel;

said front wall having outlet means therein for permitting deployment of an inflating airbag from behind the instrument panel through said outlet means;

at least two attachment legs extending rearwardly from said front wall in spaced, opposed relationship;

said outlet means in said front wall being between said two attachment legs;

interlockable means on each of said attachment legs for interlocking engagement with said interlockable means on respective module walls;

said attachment legs having band-receiving means for receiving a band extending around said attachment legs for holding the interlockable means on each of said attachment legs in interlocking engagement with the interlockable means on respective module walls with said module exit being between said attachment legs and with said outlet means being positioned in front of said module exit; and with the attachment legs extending forwardly from respective module walls defining spaced, opposed sides of a deployment passageway extending forwardly from the module exit to the outlet means in said front wall for supporting an inflating airbag and directing the inflating airbag forwardly from the module exit to said outlet means.

11. An attachment system for a vehicle airbag module as claimed in claim 10, in which:

said module has four spaced module walls positioned in a generally rectangular pattern and said interlockable means are on all four of said module walls;

said deployment door unit comprises a molded plastic deployment door unit;

four attachment legs extend rearwardly from said front wall;

said four attachment legs are positioned in a generally rectangular pattern with pairs of attachment legs located on opposite sides of said rectangular pattern being in spaced opposed relationship for defining four sides of said deployment passageway;

said outlet means in said front wall is in front of said deployment passageway; and said module exit is aimed forwardly into said deployment passageway toward said outlet means in said front wall.

12. An attachment system for a vehicle airbag module as claimed in claim 10, in which:

the attachment legs have elongated outwardly-facing, band-receiving means extending across a width of respective attachment legs configured for curving respective portions of the band into respective elongated convex arcs;

said respective elongated convex arcs of the band cause band tension to provide inwardly-directed clamping forces distributed along respective elongated outwardly-facing, band-receiving means across the width of the respective attachment legs; and said inwardly-directed clamping forces are directed inwardly toward the interlockable means of respective attachment legs.

13. An attachment system for a vehicle airbag module as claimed in claim 10, in which:

said interlockable means on each of said module walls include a recess extending essentially a width of the module wall;

a portion of each of said module walls extends essentially the width of the module wall and overhangs a forward region of each recess;

said interlockable means on each of said attachment legs include an inwardly-protruding element receivable into a respective one of said recesses; and a front portion of each inwardly-protruding element extends essentially a width of the attachment leg and is received into a respective recess and becomes engaged in hooking relationship beneath a corresponding overhanging portion of a respective module wall.

14. An airbag deployment system for a vehicle, said deployment system including an inflator, a reaction canister containing said inflator and an inflatable cushion; said airbag deployment system including:

a deployment door unit having at least two pairs of spaced, rearwardly-extending attachment legs;

said deployment door unit having an openable outlet located intermediate said attachment legs;

each of said attachment legs having an inwardly-facing protrusion;

said canister having at least two pairs of spaced canister walls each having an outwardly-facing recess for receiving a respective inwardly-facing protrusion therein;

at least one band for extending around all of the attachment legs for holding respective inwardly-facing protrusions in interlocking relationship in respective outwardly-facing recesses;

said canister having an exit for the inflatable cushion with said exit facing forwardly between said attachment legs and aligned with said openable outlet;

said two pairs of attachment legs are positioned in encircling relationship around a deployment passageway extending forwardly from said exit to said openable outlet in said deployment door unit; and during deployment of an inflatable cushion said deployment passageway supports the inflatable cushion and directs the inflatable cushion forwardly from said exit to said openable outlet.

15. An airbag deployment system as claimed in claim 14, in which:

said deployment door unit comprises a molded plastic deployment door unit;

each of said attachment legs has an outwardly-facing, band-receiving channel in its outer surface for receiving therein the band extending around all of the attachment legs;

said outwardly-facing, band-receiving channel in each attachment leg is elongated in a direction extending essentially a width of the attachment leg and generally transversely to a direction of deployment of an inflatable cushion through said deployment passageway from said exit to said openable outlet;

said inwardly-facing protrusion in each attachment leg is elongated in a direction extending essentially the width of the attachment leg and generally transversely to said direction of deployment from said exit to said openable outlet;

said outwardly-facing recess in each canister wall has a forward recess wall and a rearward recess wall and is elongated extending essentially a width of the canister wall and extending generally transversely to said direction of deployment from said exit to said openable outlet; and said band is positionable around all of the attachment legs in the outwardly-facing, band-receiving channels aligned with and overlying said elongated protrusions for holding said protrusions in the respective elongated recesses between the forward and rearward recess walls of the respective elongated recesses for providing a secure interlocking joint between the molded plastic deployment door unit and the canister with said interlocking joint being in encircling relationship around said canister.

16. An airbag deployment system as claimed in claim 15, in which:

each outwardly-facing, band-receiving channel has a convex arc profile extending essentially from an end to another end of said outwardly-facing, band-receiving channel for holding the band in a convex arcuate configuration for providing an inwardly-directed clamping force distributed along said elongated protrusion for securely holding said elongated protrusions in said elongated recesses.

17. An airbag deployment system as claimed in claim 16, in which:

said convex arc profile is provided by a plurality of ribs positioned at spaced intervals along the outwardly-facing, band-receiving channel;

said ribs have significant height near a central region of said outwardly-facing, band-receiving channel; and heights of said ribs progressively decrease toward each end of the outwardly-facing, band-receiving channel for holding the band in a convex arcuate configuration.

18. An airbag deployment system as claimed in claim 15, in which:

the outwardly-facing, band-receiving channel has divider means for dividing the outwardly-facing, band-receiving channel into a set of two, spaced parallel, outwardly-facing, band-receiving channels for receiving a set of two bands; and two bands are positionable for encircling all of the attachment legs in respective ones of said set of two outwardly-facing, band-receiving channels.

* * * * *